US012058961B2

(12) United States Patent
Schmid

(10) Patent No.: US 12,058,961 B2
(45) Date of Patent: Aug. 13, 2024

(54) MERGER CONTROL DEVICE FOR ADJUSTING CONVEYOR SPEED OR PICKUP SPEED AS A FUNCTION OF STEERING ANGLE

(71) Applicant: CLAAS Saulgau GmbH, Bad Saulgau (DE)

(72) Inventor: Christian Schmid, Owingen-Billafingen (DE)

(73) Assignee: CLAAS Saulgau GmbH, Bad Saulgau (DE)

( * ) Notice: Subject to any disclaimer, the term of this patent is extended or adjusted under 35 U.S.C. 154(b) by 327 days.

(21) Appl. No.: 17/322,810

(22) Filed: May 17, 2021

(65) Prior Publication Data

US 2021/0352848 A1 Nov. 18, 2021

(30) Foreign Application Priority Data

May 18, 2020 (DE) .......................... 102020113429.0

(51) Int. Cl.
*A01D 78/00* (2006.01)
(52) U.S. Cl.
CPC ......... *A01D 78/001* (2013.01); *A01D 78/007* (2013.01)
(58) Field of Classification Search
CPC ....... A01D 78/00–78/20; A01D 89/00–89/008
See application file for complete search history.

(56) References Cited

U.S. PATENT DOCUMENTS

| 2,674,082 | A | * | 4/1954 | Ryden | A01D 57/20 56/192 |
| 6,971,225 | B1 | * | 12/2005 | Kempf | A01D 57/20 56/398 |
| 9,642,306 | B1 | * | 5/2017 | Crosby | A01D 47/00 |
| 2014/0208708 | A1 | * | 7/2014 | Waechter | A01F 15/08 56/10.2 R |
| 2016/0324066 | A1 | * | 11/2016 | Fay, II | A01D 45/00 |
| 2019/0075720 | A1 | * | 3/2019 | Billich | A01B 69/006 |

(Continued)

FOREIGN PATENT DOCUMENTS

| EP | 2517543 A2 | 10/2012 | |
| EP | 2520155 A1 * | 11/2012 | ............. A01D 57/20 |

(Continued)

OTHER PUBLICATIONS

European Search Report, 7 pages, Oct. 22, 2024, Translation provided; References already cited.

*Primary Examiner* — Adam J Behrens
*Assistant Examiner* — Madeline I Runco

(57) ABSTRACT

Merger control device (21) for controlling the operation of a merger, wherein the merger control device (21) is designed to receive a cornering steering angle from a steering angle sensor (22, 23) as an input variable, and wherein the merger control device (21) is designed, as a function of the received cornering steering angle, to generate as an output variable at least one adjusting signal for transverse conveying devices (18) of the merger configured as belt conveyors and/or at least one adjusting signal for receiving members (17) of the merger configured as pick-ups, to output said adjusting signal to the transverse conveying devices (18) and/or receiving members (17) and to adapt the operation thereof automatically as a function of the cornering steering angle.

9 Claims, 1 Drawing Sheet

(56) References Cited

U.S. PATENT DOCUMENTS

Figure 1:
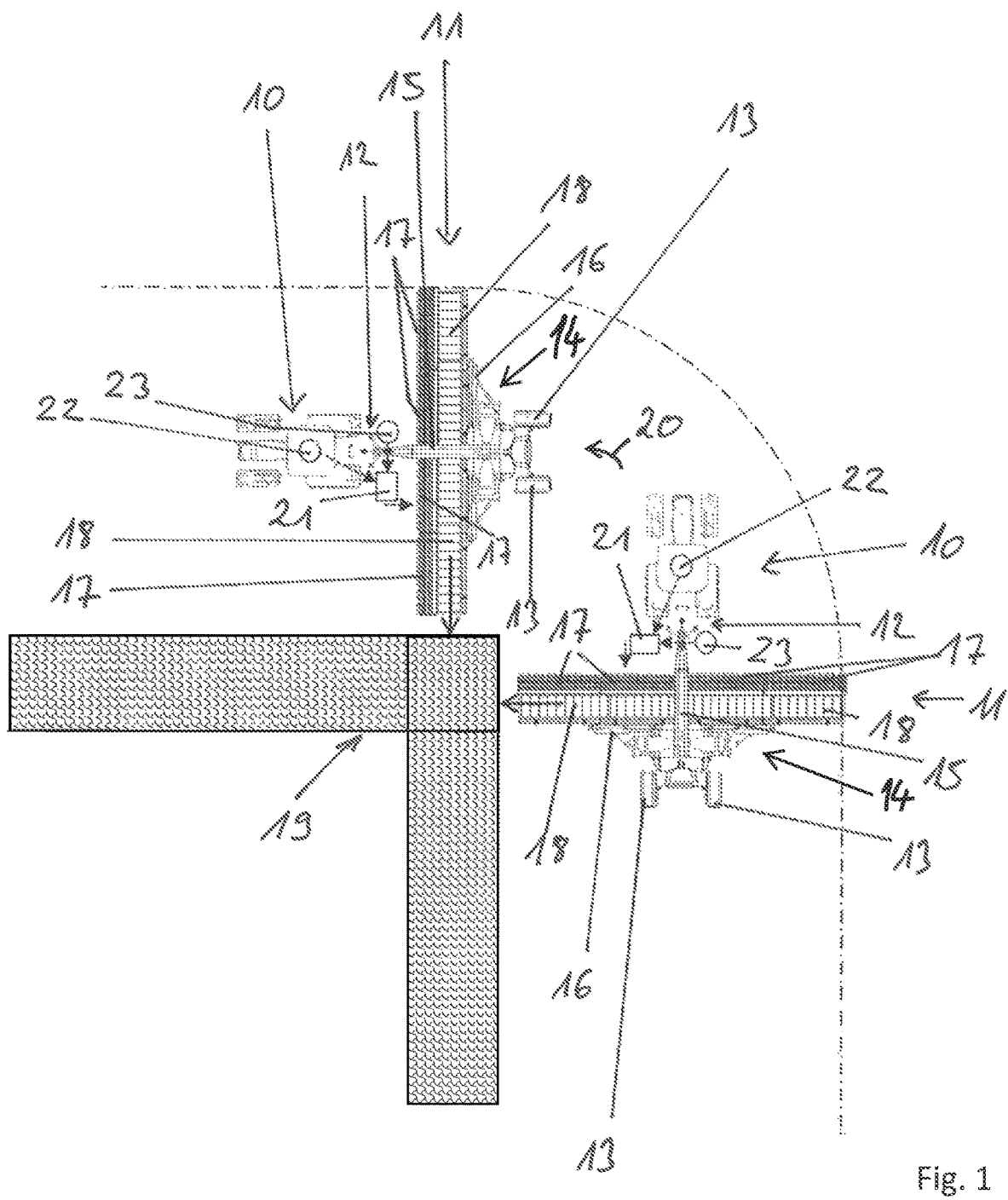

| | | | |
|---|---|---|---|
| 2019/0239429 A1* | 8/2019 | Aposhian | A01D 34/76 |
| 2021/0105947 A1* | 4/2021 | Shonk | A01F 15/18 |
| 2021/0185929 A1* | 6/2021 | Fillep | A01D 57/20 |
| 2021/0282326 A1* | 9/2021 | Fillep | A01D 75/28 |

FOREIGN PATENT DOCUMENTS

| | | | | |
|---|---|---|---|---|
| EP | 2936969 A1 | 10/2015 | | |
| EP | 2520156 B1 * | 7/2016 | | A01D 57/20 |
| EP | 3058804 A1 * | 8/2016 | | A01D 57/20 |
| EP | 3326448 A1 * | 5/2018 | | A01D 89/002 |
| EP | 3520600 A1 | 8/2019 | | |
| EP | 3837952 A1 * | 6/2021 | | A01D 34/64 |
| GB | 2497577 A * | 6/2013 | | A01B 69/006 |
| WO | 2019201394 A1 | 10/2019 | | |

\* cited by examiner

MERGER CONTROL DEVICE FOR ADJUSTING CONVEYOR SPEED OR PICKUP SPEED AS A FUNCTION OF STEERING ANGLE

The invention relates to a merger control device and a merger.

An agricultural harvesting device which is configured as a merger is disclosed in EP 2 979 529 B1. Mergers are also denoted as pick-up headers. According to this prior art, the harvesting device which is configured as a merger has a load-bearing frame and a chassis. The harvesting device which is configured as a merger also has receiving members configured as pick-ups for receiving harvested crops and transverse conveying devices configured as belt conveyors for the transverse conveyance of the received harvested crops. The agricultural harvesting device which is configured as a merger is able to be coupled to a towing vehicle via a drawbar acting on the load-bearing frame.

If a merger is operated during cornering, the problem arises that the quality of a swath formed by the merger is impaired. This is the case, in particular, when a conveying device of the transverse conveying devices is oriented toward a cornering center point, wherein the formation of the swath is all the more difficult, the narrower the cornering and/or the smaller the turning radius. In this case, namely during cornering, a very large amount of collected harvested crops are deposited locally in the swath, forming a heap, whereby not only is the shape of the swath impaired but also the efficiency of a downstream agricultural machine receiving the swath. Thus there is a need to avoid these drawbacks.

Proceeding therefrom the object of the present invention is to provide a novel merger control device and a merger having such a merger control device.

This object is achieved by a merger control device for controlling the operation of a merger or a pick-up header according to claim 1.

The merger control device according to the invention is designed to receive a steering angle from a steering angle sensor as an input variable.

Moreover, the merger control device according to the invention is designed, as a function of the received cornering steering angle, to generate as an output variable at least one adjusting signal for transverse conveying devices of the merger configured as belt conveyors and/or at least one adjusting signal for receiving members of the merger configured as pick-ups, to output said adjusting signal to the transverse conveying devices and/or receiving members and to adapt the operation thereof automatically as a function of the cornering steering angle.

By means of the present invention it is firstly proposed to adapt automatically the operation of the transverse conveying devices and/or the receiving members of a merger or pick-up head during cornering, and namely as a function of the cornering steering angle. If a steering angle which corresponds to straight-ahead travel is present, the merger control device does not adapt the operation of the transverse conveying devices and/or receiving members. However, if a cornering steering angle is present, the merger control device automatically adapts the operation of the transverse conveying devices and/or the operation of the receiving members. Thus the swath formation may be made more uniform even during cornering. A good swath shape may be formed even during cornering. Thus it is possible to avoid problems for an agricultural machine which serves for receiving the swath.

According to an advantageous development, the merger control device generates the at least one adjusting signal for the receiving members configured as pick-ups, such that receiving members located on the inside during cornering are able to be operated more slowly than receiving members located on the outside during cornering, wherein the merger control device preferably selects a speed difference between the receiving members located on the inside during cornering and the receiving members located on the outside during cornering to be all the greater, the larger the cornering steering angle. This is particularly preferred in order to form a uniform swath shape during the cornering of the merger.

According to an advantageous development, the merger control device generates the at least one adjusting signal for the transverse conveying devices configured as belt conveyors, such that the transverse conveying devices are able to be operated all the more slowly, the larger the cornering steering angle. This is preferred if the conveying direction of the transverse conveying devices is oriented toward a curve center point of the cornering. This development of the invention also serves to form a uniform swath shape during the cornering of the merger. To this end, the speed of the transverse conveying devices may be decelerated to a standstill, wherein the receiving members at the same time continue to collect the harvested crops located on the ground and convey said harvested crops to the transverse conveying devices.

The merger according to the invention is defined in claim 8.

Preferred developments of the invention are disclosed in the subclaims and the following description. Exemplary embodiments of the invention are described in more detail with reference to the drawing, without being limited thereto. In the drawing:

FIG. 1 shows a perspective view from above of a towing combination which comprises a merger and a towing vehicle during cornering.

The invention relates to a merger control device and a merger which has such a merger control device. Mergers are also denoted as pick-up headers.

FIG. 1 shows a view of a towing combination consisting of a towing vehicle 10 and a merger 11 during cornering, wherein the cornering is illustrated by an arrow 20. FIG. 1 shows the towing combination, on the one hand, in a state before traveling into the curve and, on the other hand, in a state after traveling out of the curve. The merger 11 forms a swath 19 and namely in FIG. 1 oriented inwardly relative to the cornering in the direction of a cornering center point.

The merger 11 is coupled to the towing vehicle 10 via a drawbar 12. The drawbar 12 acts on a load-bearing frame 14 of the merger 11 and is arranged in the extension of a longitudinal member 15 of the load-bearing frame 14. The longitudinal member 15 extends in the direction of travel of the towing combination consisting of the towing vehicle 10 and the merger 11.

The load-bearing frame 14 of the merger 11 also has crossmembers 16. The crossmembers 16 extend transversely or perpendicularly to the direction of travel of the merger 11. On the one hand, receiving members 17 and, on the other hand, transverse conveying devices 18 are mounted on the crossmembers 16.

The receiving members 17 of the merger 11 are configured as so-called pick-ups and serve for receiving harvested crops from the ground to be worked. At least one receiving member 17 is arranged on a first side of the longitudinal member 15 and at least one receiving member 17 is also arranged on an opposing second side of the longitudinal member 15. Preferably as shown in FIG. 1, in each case two receiving members 17 are arranged on each side of the longitudinal member 15. The receiving members 17 have receiving tines which are driven about an axis extending transversely to the direction of travel for receiving harvested crops from the ground to be worked.

As already disclosed, the merger 11 has transverse conveying devices 18 in addition to the receiving members 17. The transverse conveying devices 18 of the merger 11 are configured as belt conveyors. The harvested crops, which are received via the receiving members 17 from the ground to be worked, are able to be transported in a direction extending transversely to the direction of travel via the transverse conveying devices 18. As already disclosed, in FIG. 1 the merger 11, namely the transverse conveying devices 18 thereof, conveys the harvested crops inwardly in the direction of a cornering center point. At least one transverse conveying device 18 is arranged on a first side of the longitudinal member 15 of the load-bearing frame 14 and at least one further transverse conveying device 18 is arranged on an opposing second side of the longitudinal member 15. Each of these transverse conveying devices 18 is designed as a belt conveyor. Preferably, as shown in FIG. 1, in each case a single transverse conveying device 18 is arranged on each side of the longitudinal member 15. However, it is also possible to arrange two respective transverse conveying devices on either side—for example divided belt units which transfer the harvested crops to one another. Preferably, however, in each case the same number of transverse conveying devices are symmetrically arranged on either side of the longitudinal member 15.

The merger 11 also has a chassis, wherein the wheels 13 of the chassis of the merger 11 are shown. The merger 11 is supported via these wheels 13 on the ground to be worked. Although not visible in FIG. 1, each of the receiving members 17 is supported via feeler wheels on the ground to be worked. Alternatively or additionally, other guide elements, such as for example skids, sliding plates or the like, may also be provided.

A merger 11 has a merger control device 21 in order to control and/or regulate the operation of the merger 11. The invention relates to the control of the operation of the merger 11 via the merger control device 21 during cornering, in order to ensure a swath formation which is as uniform as possible.

The merger control device according to the invention 21 is designed to receive a steering angle from a steering angle sensor 22, 23 as an input variable.

FIG. 1 shows two steering angle sensors 22, 23. The one steering angle sensor 22 is assigned to the towing vehicle 10 and, as a function of an actuation of the steering wheel on the towing vehicle 10, extrapolates the steering angle and during cornering extrapolates a cornering turning radius. The merger control device 21 is preferably also designed to receive a speed signal from a speed sensor—arranged on the towing vehicle 10 or on the merger 11. On this basis, using the steering angle and the speed, the merger control device 21 calculates the respective turning radius which is actually produced.

The other steering angle sensor 23 is assigned to the merger 11 and is installed, in particular, in the region of the drawbar 12. This steering angle sensor 23 may also detect a steering angle. The steering angle sensor 23 assigned to the merger 11 is preferably designed as a drawbar sensor which detects the angle which is produced between the longitudinal axis of the towing vehicle 10 and the longitudinal axis of the merger 11 during cornering. The currently traveled turning radius may be directly extrapolated from this angle. If the steering angle sensor 23 is installed in the region of the merger 11 a transmission of data from the towing vehicle 10 to the merger control device 21 is not required.

The steering angle provided by the steering angle sensor 22, 23 provides information about whether the merger 11 is operated in straight-ahead travel or cornering.

During cornering, the steering angle, which is provided by the respective steering angle sensor 22, 23, provides information about the cornering radius, thus whether a narrow cornering or a wide cornering of the merger 11 and/or of the towing combination consisting of the merger 11 or towing vehicle 10 is present.

The merger control device 21 according to the invention is also designed, as a function of the received cornering steering angle, to generate as an output variable at least one adjusting signal for the transverse conveying devices 18 of the merger 11 configured as belt conveyors and/or at least one adjusting signal for the receiving members 17 of the merger 11 configured as pick-ups, to output the at least one adjusting signal to the transverse conveying devices 18 and/or the receiving members 17 and to adapt automatically via the at least one adjusting signal the operation of the transverse conveying devices 18 and/or the receiving members 17 as a function of the cornering steering angle.

Preferably it is provided that the merger control device 21 generates the at least one adjusting signal for the receiving members 17 configured as pick-ups, such that receiving members 17 located on the inside during cornering are able to be operated more slowly than receiving members 17 located on the outside during cornering. Thus the receiving members 17 located on the outside during cornering have to travel over a larger area of the ground to be worked and accordingly receive more harvested crops than the receiving members 17 located on the inside during cornering. In order to improve the receiving of crops from the ground to be worked during cornering, therefore, the invention proposes that the merger control device 21 generates the at least one adjusting signal for the receiving members 17 such that the receiving members located on the inside during cornering are able to be operated more slowly than the receiving members located on the outside during cornering and/or the receiving members located on the outside during cornering are able to be operated more rapidly than the receiving members located on the inside during cornering. To this end, the rotational speed of the receiving members 17 configured as pick-ups is automatically adapted via the respective adjusting signal. In this case a speed difference and/or rotational speed difference for the operation of the receiving members 17 located on the inside during cornering and the receiving members 17 located on the outside during cornering is selected by the merger control device 21 to be all the greater, the larger the steering angle.

Additionally or alternatively to the at least one adjusting signal for the receiving members 17 configured as pick-ups, the merger control device 21 generates at least one adjusting signal for the transverse conveying devices 18 configured as belt conveyors. In the exemplary embodiment shown in FIG. 1 in which the conveying direction of the transverse conveying devices 18 is oriented toward a curve center point of the cornering, and accordingly the swath 19 is formed on the inside during cornering, the merger control device 21 generates the at least one adjusting signal for the transverse conveying devices 18 such that the transverse conveying devices 18 are able to be operated all the more slowly, the larger the steering angle. In this case, the transverse conveying devices 18 located on the inside during cornering and the transverse conveying devices 18 located on the outside during cornering are driven at the same speed. The speed of the transverse conveying devices 18 may be decelerated to a standstill to avoid the formation of a heap, wherein the receiving members 17 at the same time continue to collect the harvested crops located on the ground and convey said harvested crops to the transverse conveying devices 18.

If a conveying direction of the transverse conveying devices 18 is oriented outwardly, i.e. is oriented away from the curve center point of the cornering, in order to form a swath on the outside, and namely adjacent to the line shown in dashed-dotted lines in FIG. 1, the merger control device 21 preferably generates the at least one adjusting signal for the transverse conveying devices 18 configured as belt conveyors such that the speed of the transverse conveying devices 18 either remains unchanged or is all the more rapid, the larger the steering angle.

If the merger 11 is operated in straight-ahead travel, the receiving members 17 configured as pick-ups and the transverse conveying devices 18 configured as belt conveyors are in each case operated via the merger control device 21 at a target speed. When traveling into a curve, these target speeds are automatically adapted. During cornering at a constant steering angle, therefore, the adapted target speeds remain unchanged. When traveling out of the cornering the corresponding target speeds are changed again such that they correspond to the target speeds of straight-ahead travel.

An adaptation of the speed for the operation of the receiving members 17 and an adaptation of the speed for the operation of the transverse conveying devices 18 may be carried out independently of one another. Thus when the speeds of both the receiving members 17 and the transverse conveying devices 18 are adapted, the corresponding adaptations do not have to be carried out simultaneously. Thus it is possible to adapt initially only the speed of the receiving members 17 and then the speed of the transverse conveying devices 18 to the cornering. Furthermore, the speed of the transverse conveying devices 18 may be initially adapted to the cornering and only subsequently thereto the speed of the receiving members 17. This may also be carried out as a function of the steering angle. Thus it is possible in the case of relatively small steering angles to adapt automatically either only the transverse conveying devices 18 or the receiving members 17 regarding their operation, as a function of the steering angle. With relatively large steering angles it is possible to adapt automatically both the transverse conveying devices 18 and the receiving members 17 automatically regarding their operation, as a function of the steering angle.

The invention relates not only to the merger control device 21 but also to the merger 11 which, in addition to the receiving members 17 configured as pick-ups and the transverse conveying devices 18 configured as belt conveyors, has the above-described merger control device 21. The operation of the receiving members 17 and/or transverse conveying devices 18 may be adapted automatically by the merger control device 21 as a function of the steering angle.

The receiving members 17 in this case may be individually activated in order to set different speeds on the different receiving members 17 as a function of the steering angle.

Preferably the merger 11 has the steering angle sensor 23 which is installed in the region of the drawbar 12 in order to detect the steering angle directly on the merger 11 and to simplify the communication with the merger control device 21.

If the steering angle sensor 23 assigned to the merger 11 is designed as a drawbar sensor which detects the angle which is produced between the longitudinal axis of the towing vehicle 10 and the longitudinal axis of the merger 11 during cornering, the currently traveled turning radius may be directly extrapolated from the value of the steering angle sensor 23. In this embodiment, the adjusting signals for the transverse conveying devices 18 and/or receiving members 17 may be output without delay. If the merger control device 21 is based on the steering angle sensor 22 which is assigned to the towing vehicle 10, the corresponding turning radius is produced only when the towing combination has covered a specific distance. In this case it may be provided to delay the output of the adjusting signals for the transverse conveying devices 18 and/or receiving members 17.

The merger control device 21 according to the invention is not limited to the described towed merger 11 but may also be provided on a self-propelled merger.

LIST OF REFERENCE NUMERALS

10 Towing vehicle
11 Merger
12 Drawbar
13 Wheels
14 Load-bearing frame
15 Longitudinal member
16 Crossmember
17 Receiving member
18 Transverse conveying device
19 Swath
20 Cornering
21 Merger control device
22 Steering angle sensor
23 Steering angle sensor

The invention claimed is:

1. A merger control device (21) for controlling the operation of a merger or a pick-up header, comprising:
   at least two receiving members (17) configured as pick-ups for receiving harvested crops,
   at least two transverse conveying devices (18) configured as belt conveyors for the conveyance of the received harvested crops in a transverse direction of conveyance running transversely to a harvesting direction or direction of travel,
   wherein the merger control device (21) is designed to receive a cornering steering angle from a steering angle sensor (22, 23) as an input variable,
   wherein the merger control device (21) is configured, as a function of the received cornering steering angle, to generate as an output variable at least one adjusting signal for each of the at least two transverse conveying devices (18) of the merger configured as belt conveyors and at least one adjusting signal for each of the at least two receiving members (17) configured as pick-ups, to output said adjusting signal to the at least two transverse conveying devices (18) and the at least two receiving members (17) and to adapt the operation thereof automatically as a function of the cornering steering angle.

2. The merger control device according to claim 1, characterized in that said merger control device generates the at least one adjusting signal for the at least two receiving members (17) configured as pick-ups, such that any of the at least two receiving members (17) located on the inside during cornering are able to be operated more slowly than any of the at least two receiving members (17) located on the outside during cornering.

3. The merger control device according to claim 2, characterized in that said merger control device selects a speed difference between any of the at least two receiving members (17) located on the inside during cornering and any of the at least two receiving members (17) located on the outside during cornering to be all the greater, the larger the cornering steering angle.

4. The merger control device according to claim 1, characterized in that said merger control device generates the at least one adjusting signal for the at least two transverse conveying devices (18) configured as belt conveyors, such that the at least two transverse conveying devices (18) are able to be operated all the more slowly, the larger the cornering steering angle.

5. The merger control device according to claim 4, characterized in that said merger control device generates said at least one adjusting signal for the at least two transverse conveying devices (18) when the conveying device of the transverse conveying devices (18) is conveying material toward a curve center point of the cornering.

6. The merger control device according to claim 1, characterized in that said merger control device generates the at least one adjusting signal for the at least two transverse conveying devices (18) configured as belt conveyors, such that the at least two transverse conveying devices (18) are able to be operated all the more rapidly, the larger the cornering steering angle.

7. The merger control device according to claim 6, characterized in that said merger control device generates said at least one adjusting signal for the at least two transverse conveying devices (18) when the conveying device of the at least two transverse conveying devices (18) is conveying material away from a curve center point of the cornering.

8. The merger according to claim 1, characterized by a steering angle sensor (23) for detecting a cornering steering angle which is designed, in particular, as a drawbar sensor which detects an angle which is produced between the longitudinal axis of a towing vehicle (10) towing the merger (11) and the longitudinal axis of the merger (11) during cornering.

9. A merger control device (21) for controlling the operation of a merger or a pick-up header, comprising:
two receiving members (17) configured as pick-ups for receiving harvested crops,
at least two transverse conveying devices (18) configured as a belt conveyor for the conveyance of the received harvested crops in a transverse direction of conveyance running transversely to a harvesting direction or direction of travel,
a steering angle sensor (23) for detecting a cornering steering angle which is designed, in particular, as a drawbar sensor which detects an angle which is produced between the longitudinal axis of a towing vehicle (10) —towing the merger (11) —and the longitudinal axis of the merger (11) during cornering,
wherein the merger control device (21) is designed to receive a cornering steering angle from the steering angle sensor (22, 23) as an input variable,
wherein the merger control device (21) is configured, as a function of the received cornering steering angle, to generate as an output variable at least one adjusting signal for the at least two transverse conveying devices (18) of the merger configured as belt conveyors and at least one adjusting signal for the two receiving members (17) of the merger configured as pick-ups, to output said adjusting signal to the at least two transverse conveying devices (18) and two receiving members (17) and to adapt the operation thereof automatically as a function of the cornering steering angle.

* * * * *